(12) United States Patent
Olsen et al.

(10) Patent No.: US 10,673,688 B2
(45) Date of Patent: Jun. 2, 2020

(54) GROUP ASSOCIATION FALLBACK FOR IMPROVED NETWORK RESILIENCE

(71) Applicant: Silicon Laboratories Inc., Austin, TX (US)

(72) Inventors: Christian Salmony Olsen, Herlev (DK); Jørgen Franck, Bagsværd (DK); Peter Shorty, Valby (DK); Anders T. Brandt, Søborg (DK)

(73) Assignee: Silicon Laboratories, Inc., Austin, TX (US)

( * ) Notice: Subject to any disclaimer, the term of this patent is extended or adjusted under 35 U.S.C. 154(b) by 0 days.

(21) Appl. No.: 16/137,815

(22) Filed: Sep. 21, 2018

(65) Prior Publication Data
US 2020/0099576 A1    Mar. 26, 2020

(51) Int. Cl.
*H04L 12/24* (2006.01)
*H04L 12/66* (2006.01)
*H04L 12/26* (2006.01)

(52) U.S. Cl.
CPC .......... *H04L 41/0668* (2013.01); *H04L 12/66* (2013.01); *H04L 41/064* (2013.01); *H04L 41/065* (2013.01); *H04L 41/0663* (2013.01); *H04L 41/0893* (2013.01); *H04L 43/16* (2013.01)

(58) Field of Classification Search
CPC . H04L 41/0668; H04L 41/0893; H04L 43/16; H04L 12/66; H04L 41/064; H04L 41/065; H04L 41/0663; H04W 52/0238; H04W 76/18; H04W 52/0209; H04W 76/28; Y02D 70/166; Y02D 70/1226; Y02D 70/24; Y02D 70/144; Y02D 70/23; Y02D 70/1224; Y02D 70/1242; Y02D 70/164; Y02D 70/162; Y02D 70/1244; Y02D 70/26; Y02D 70/146; Y02D 70/142; Y02D 70/1262
See application file for complete search history.

(56) References Cited

U.S. PATENT DOCUMENTS

| | | |
|---|---|---|
| 6,275,470 B1 | 8/2001 | Ricciulli |
| 8,555,344 B1 | 10/2013 | Wiedmann et al. |
| 2016/0198514 A1* | 7/2016 | Wang ................ H04W 52/0209 370/311 |

* cited by examiner

*Primary Examiner* — Dady Chery
(74) *Attorney, Agent, or Firm* — Nields, Lemack & Frame, LLC (57) ABSTRACT

A system and method for improving network resiliency is disclosed. The system includes a network having a plurality of network devices and at least one controller. The controller is configured to create various scenes based on the inputs received from the network devices. The controller is also configured to provide alternate instructions to the network devices in the event that the controller is non-functional. The network devices utilize these alternate instructions when attempts to connect the controller are unsuccessful. In this way, the network is able to operate in a limited way even in the absence of the controller.

20 Claims, 6 Drawing Sheets

GROUP ASSOCIATION FALLBACK FOR IMPROVED NETWORK RESILIENCE

FIELD

This disclosure describes systems and methods for improving network resilience through the use of fallback group associations.

BACKGROUND

In certain networks, there may be a plurality of slave devices and one or more controllers. These slave devices may be input devices which relay information to the controller, or output devices that receive information from the controller. In one specific example, the network may be a smart home network.

For example, in a smart home network, certain network devices, referred to as input devices, may detect certain conditions, such as a door bell being actuated, a temperature change, movement, smoke, or a change in ambient light. This information is then relayed to a controller, which may determine some action or set of actions that are to be undertaken based on this information. The controller then relays commands to other network devices, referred to as output devices, to affect these actions. For example, the controller may command the output devices to turn on or off lighting, open or close window coverings, play an audio file, or notify a remote mobile device.

For example, in one particular embodiment, the input device may be a door bell, which upon actuation, transmits information to the controller. The controller may then actuate a hallway light, actuate the door chime as well as a recording of a barking dog, and send a notification to a user's mobile device. This is all achieved by sending commands from the controller to multiple slave devices.

However, if the controller is non-functioning, the system no longer operates. For example, the controller may be disabled for a number of reasons. These include local power outage, a failed firmware update, an AC adapter breakdown, a hardware failure, a failed network repeater, or an unintended disconnection from the network.

If the controller is non-functioning, the actuation of the door bell is not acted upon and none of the actions noted above are performed. This may require an urgent service call to remedy the problem. For example, a service provider may need to dispatch a service technician to address the problem.

Therefore, it would be beneficial if there were a system and method by which the network could continue to operate, even in a limited capacity, if the controller is no longer functional or accessible. In this way, even if the service call is still necessary, it may no longer be urgent, as the home network retains some basic functionality.

SUMMARY

A system and method for improving network resiliency is disclosed. The system includes a network having a plurality of network devices and at least one controller. The controller is configured to create various scenes based on the inputs received from the network devices. The controller is also configured to provide alternate instructions to the network devices in the event that the controller is non-functional or inaccessible. The network devices utilize these alternate instructions when attempts to connect the controller are unsuccessful. In this way, the network is able to operate in a limited way even in the absence of the controller.

According to one embodiment, a method of operating a network, wherein the network comprises a plurality of network devices and a gateway controller, is disclosed. The method comprises detecting an event at a first network device; transmitting a notification from the first network device to the gateway controller, reporting the event; and entering a fallback mode at the first network device if no response is received from the gateway controller. In certain embodiments, during fallback mode, the first network device transmits commands to other network devices, different from the gateway controller. In a further embodiment, the gateway controller provides the commands and identities of the other network devices to be used during fallback mode to the first network device. In certain embodiments, the method further comprises detecting a second event at the first network device; and sending a command from the first network device to another network device if the first network device is in the fallback mode. In a different embodiment, the method further comprises detecting a second event at the first network device while in fallback mode; determining an amount of time that has elapsed since the first network device entered fallback mode; and sending a report from the first network device to the gateway controller if the amount of time is greater than a predetermined threshold. In a further embodiment, the method also comprises sending a command from the first network device to another network device if the amount of time is less than the predetermined threshold.

According to another embodiment, a method of operating a network comprising a network device and a gateway controller is disclosed. The method comprises sending a report from the network device to the gateway controller, wherein the report indicates whether a fallback mode is supported; sending from the gateway controller to the network device a set of commands defining groupings; sending from the gateway controller to the network device a set of commands to be used in fallback mode; and sending a command from the gateway controller to the network device to enable fallback mode. In certain embodiments, the method further comprises operating the network device in normal operating mode while the network device is able to communicate with the gateway controller; and switching the network device to fallback mode when the network device is unable to communicate with the gateway controller. In certain embodiments, in fallback mode, the network device transmits commands, selected from the set of commands, to other network devices, wherein the other network devices are identified in the groupings.

According to another embodiment, a network device is disclosed. The network device comprises a network interface; processing unit; and a memory in communication with the processing unit, the memory comprising instructions, which when executed by the processing unit; enable the network device to: detect an event; transmit a notification to a gateway controller using the network interface, reporting the event; and enter a fallback mode if no response is received from the gateway controller. In certain embodiments, the network device also has instructions which enable the network device to: transmit commands using the network interface to other network devices, different from the gateway controller, while in fallback mode. In certain embodiments, the network device also has instructions which enable the network device to: detect a second event; and send a command using the network interface to another network device if the network device is in the fallback mode. In certain embodiments, the network device also has instructions which enable the network device to: detect a second event while in fallback mode; determine an amount of time that has elapsed since the network device entered fallback mode; and send a report to the gateway controller using the network interface if the amount of time is greater than a predetermined threshold.

According to another embodiment, a gateway controller is disclosed. The gateway controller comprises a network interface; a processing unit; and a memory in communication with the processing unit, the memory comprising instructions, which when executed by the processing unit; enable the gateway controller to: receive a report from a network device using the network interface; determine based on the report whether the network device supports fallback mode; determine actions to perform based on an event reported by the network device; determine basic commands that network device should perform in fallback mode; transmit the basic commands to network device using network interface; and transmit a command to the network device enabling fallback mode. In certain embodiments, the gateway controller also has instructions that enable the gateway controller to: transmit groupings to the network device, wherein the groupings are used by the network device in fallback mode.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
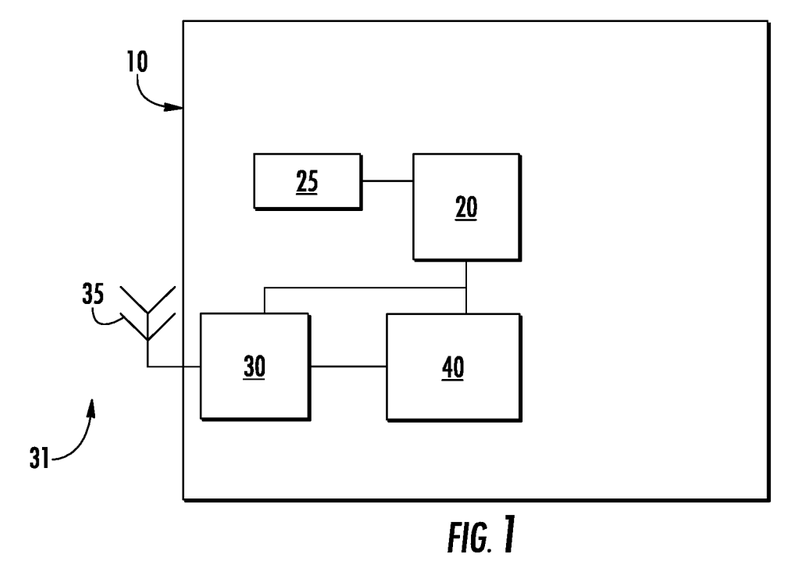
FIG. 1 is a block diagram of a representative network device.

FIG. 1 shows a block diagram of a representative network device 10. This network device may serve as an input device, an output device or a gateway controller, as described in more detail below.

As shown in FIG. 1, the network device 10 has a processing unit 20 and an associated memory device 25. The processing unit may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The network device 10 also includes a network interface 30, which may be a wireless interface including an antenna 35. The network interface 30 may support any wireless network, such as Wi-Fi, networks utilizing the IEEE 802.15.4 specification, such as Zigbee, networks utilizing the IEEE 802.15.6 specification, and wireless smart home protocols, such as Z-Wave. The network interface 30 is used to allow the network device to communicate with other devices disposed on the network 31.

The network device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the network 31. Although not shown, the network device 10 also has a power supply, which may be a battery, an energy harvester or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the network device 10. The instructions contained on this second computer readable media may be downloaded onto the memory device 25 to allow execution of the instructions by the network device 10.

While the processing unit 20, the memory device 25, the network interface 30, and the second memory device 40 are shown in FIG. 1 as separate components, it is understood that some or all of these components may be integrated into a single electronic component. Rather, FIG. 1 is used to illustrate the functionality of the network device 10, not its physical configuration.

Figure 2:
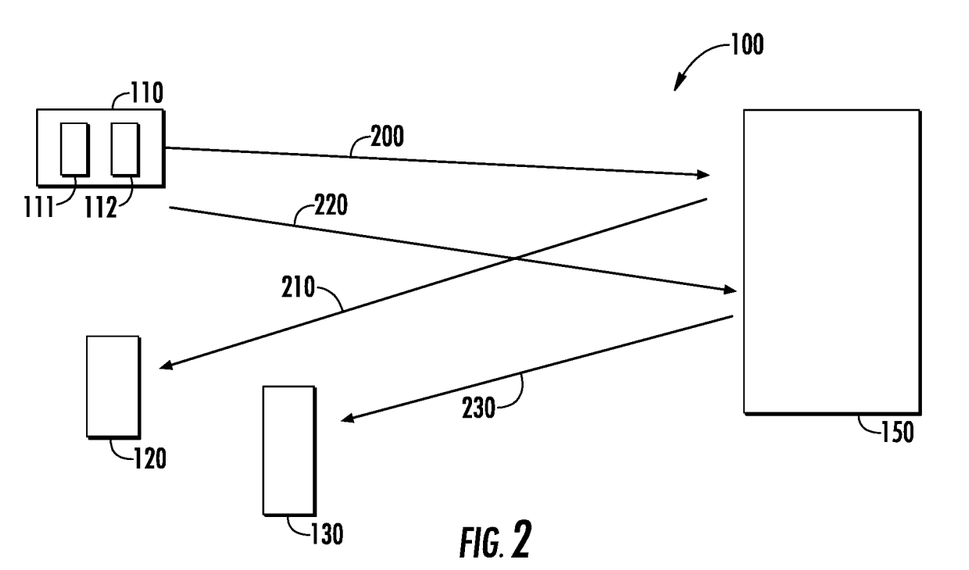
FIG. 2 shows communications occurring in a network having a plurality of network devices, including a gateway controller and a plurality of network devices according to one embodiment.

FIG. 2 shows a network 100 having a plurality of network devices and a gateway controller 150. The plurality of network devices may include one or more input devices, such as a wall switch 110, and one or more output devices, such as first light 120 and second light 130. The wall switch 110 may have a plurality of buttons, including first button 111 and second button 112. Although a wall switch 110 is disclosed, the input device is not limited to this embodiment. The input device may also be a door bell, a sensor, such as a heat sensor, smoke sensor, motion sensor, thermometer, or any other input device. Similarly, the output devices need not be lights; other output devices, such as a window covering actuator, an audiovisual device or a thermostat.

Each of these devices may be network devices having the components described above and shown in FIG. 1. The architecture of the gateway controller 150 may differ somewhat from that of the other devices. For example, the gateway controller 150 may have a more powerful processing unit 20. The memory device 25 and the second memory device 40 of the gateway controller 150 may be larger than that in other devices. Further, the gateway controller 150 may be powered by a wall outlet, rather than a battery. In certain embodiments, the gateway controller 150 may also include a second network interface to connect to another wired or wireless network.

In one particular embodiment, the network 100 may be a Z-Wave network. The Z-Wave protocol defines a plurality of command classes, such as Central Scene command class, Multilevel Switch command class, Color Switch command class, Sound Switch command class, Window Covering command class and others. Further, the Z-Wave protocol defines a concept of associations, where a plurality of network devices may be grouped together. In other words, the gateway controller 150 may send a command to a particular grouping or association, and all network devices that are part of that association will execute the command.

The devices in the network of FIG. 2 may operate in at least two different modes. These two modes may be referred to as normal operation and fallback mode.

During normal operation, the first button 111 on the wall switch 110 may be actuated. In response, the wall switch 110 sends a report 200 to the gateway controller 150, informing the gateway controller 150 of this event. In this embodiment, the wall switch 110 may send the report 200 to the Lifeline Association, also referred to as Association 1. Throughout this disclosure, it is assumed that the gateway controller 150 is the Lifeline Association destination. This report may be a Central Scene Notification, indicating a button push or key press.

In response to this report 200, the gateway controller 150 may determine that some action should be taken. For example, in one embodiment, one or more lights should be actuated. A software program, referred to as a control application, may reside in the memory device of the gateway controller 150. The processing unit in the gateway controller 150 executes the instructions in the control application to perform the functions described herein.

The gateway controller 150 may consider a number of factors before applying colors and light levels to lights in the room. For instance, morning light may be warmer and less bright, while evening light is bluer and slightly brighter. Once the gateway controller 150 determines the appropriate settings, the gateway controller 150 transmits a first command 210 to one or more of the output devices, such as first light 120. In this example, the first light 120 and the second light 130 may be members of different groupings or associations. This first light 120 may be a dimmable light, or may have the ability to emit different colors. Based on the information contained in the Central Scene Notification, the gateway controller 150 may send a Multilevel Switch Get command, which sets the brightness level of light for the first light 120. Alternatively, the gateway controller 150 may send a Color Switch Get command, which sets the color of light emitted by the first light 120.

In response, the first light 120 may be actuated in the manner indicated in the command 210.

Similarly, when the second button 112 on the wall switch 110 is pushed, the wall switch 110 may send a different report 220 to the gateway controller 150, informing the gateway controller 150 of this event. The gateway controller 150 may determine that a different action is necessary based on this event. For example, the gateway controller 150 may transmit a second command 230 to the second light 130. Like the first command, the second command 230 may be a Multilevel Switch Get command or a Color Switch Set command.

Of course, the commands issued by the gateway controller 150 do not have to be those described above. These are merely illustrative. The gateway controller 150 may issue any suitable command to any type of output device.

However, in certain embodiments, the gateway controller 150 may not be accessible to the network device, as explained above. In the scenario shown in FIG. 2, if this occurs, the system ceases to operate.

Figure 3:
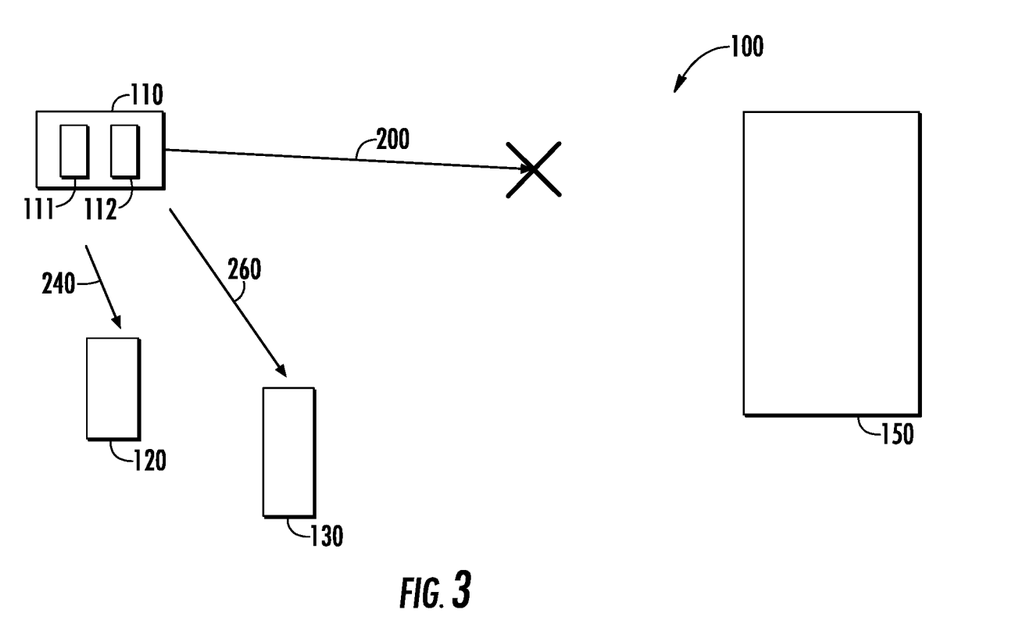
FIG. 3 shows communications occurring in the network of FIG. 2 while in fallback mode according to one embodiment.

FIG. 3 shows an embodiment where the network device, such as wall switch 110, sends a report 200 to the gateway controller 150, but no response is received from the gateway controller 150. In this embodiment, the wall switch 110 assumes that the gateway controller 150 is no longer functional or accessible. Thus, the wall switch 110 actuates a fallback mode. In this fallback mode, the wall switch 110 sends a command 240 directly to the first light 120.

In certain embodiments, the wall switch 110 does not have the same functionality as the gateway controller 150. Therefore, the wall switch 110 may not support all of the command classes, such as Color Switch command class or Multilevel Switch command class. In this case, the wall switch 110 may issue a command 240 using the Basic command class. Thus, rather than adjusting brightness or color of the first light 120, the command 240 may simply turn on the first light 120. Unlike the original report 200, which was a Central Scene Notification sent to the Lifeline Association, this command 240 may be sent to a different Association.

Further, in fallback mode, the wall switch 110 may send a command 260 to the second light 130 if the second button is pressed. As stated above, the second light 130 may be a member of a different Association than the first light 120. Thus, the wall switch 110 may send a command from the Basic command class to a different Association to actuate the second light 130.

In summary, when the gateway controller 150 cannot be accessed, the wall switch 110 falls back and controls the living room lamps directly via Basic and Multilevel Switch commands.

In another example, a doorbell button device may send Central Scene Notifications to the gateway controller 150. The gateway controller 150 may turn on the hall light, activate the door chime as well as a recorded dog barking. Finally, a notification may be forwarded to the doorbell application on the home owner's smart phone.

When the gateway controller 150 cannot be accessed, the doorbell button device falls back and controls the doorbell chime directly via Basic commands. In this fallback mode, the other actions are not taken.

As stated above, the Z-Wave protocol already defines all the Command Classes (CC) needed to communicate button presses to a central scene controller (Central Scene CC) and to turn on lamps locally (Multilevel Switch CC, Basic CC). There are also command classes for the discovery and configuration of association resources (Association CC, AGI CC).

Therefore, resilience may be added to a centralized network by having the gateway controller 150 push simplified rules to network devices so that if a network device cannot deliver a Central Scene Notification via the Lifeline Association group, that network device sends direct commands to the destinations configured in other association groups. For instance, a wall switch may be configured to control lamps in the same room directly, but only if the gateway controller cannot be accessed. These simplified commands may include but are not limited to: turning on or off a light; activating a bell or recording; opening a curtain; actuating an alarm; actuating a camera or video device; or sending a text to a mobile device.

Figure 4:
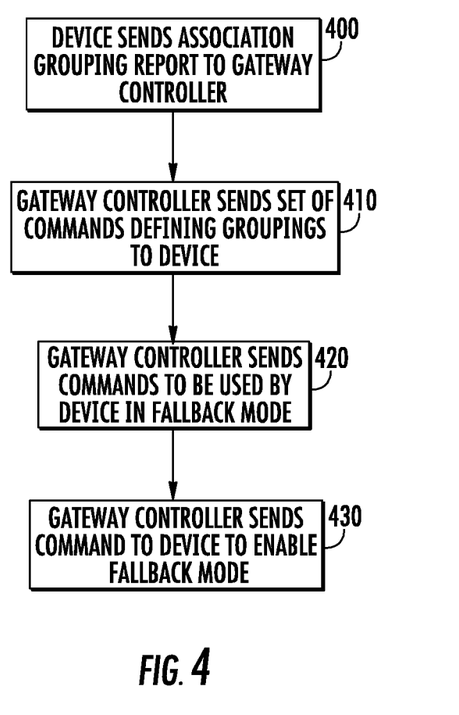
FIG. 4 shows an initialization process according to one embodiment.

FIG. 4 is a flowchart showing how the wall switch 110 (or any other suitable network device) can be configured by the gateway controller 150 to operate in normal mode and in fallback mode.

First, as shown in Process 400, the network device may send a report to the gateway controller 150. This report may be an Association Grouping Report command. In this report, the network device informs the gateway controller 150 of the number of associations that it supports. It may also indicate whether the network device supports fallback mode.

Based on the type of network device, the gateway controller 150 determines the primary actions of that network device, as well as the fallback mode actions. For example, in normal mode, the network device may simply provide a report to the gateway controller 150. Thus, the primary action may be to transmit a report to Association 1, also referred to as the Lifeline Association. To create this behavior, the gateway controller 150 transmits an AssociationSet command, which indicates that Association 1 is connected to the gateway controller 150. The gateway controller 150 may also transmit additional AssociationSet commands, which indicate which nodes are associated with the other associations supported by the network device. For example, in this particular example, the network device may support three groupings; a first group which is the Lifeline Association, and an addition group for each of the buttons disposed in the wall switch 110. For example, assume that the gateway controller 150 is given nodeID 1, the first light 120 is given nodeID 3 and the second light 130 is given nodeID 4. A nodeID is a unique address for the device in the network. The commands from the gateway controller 150 to the network device may be as follows:

AssociationSet(Grp 1→1)
AssociationSet(Grp 2→3)
AssociationSet(Grp 3→4)

Thus, as shown in Process 410, the gateway controller 150 issues a set of commands to the network device that define the groupings for that network device.

Then, as shown in Process 420, the gateway controller 150 may supply the commands that the network device is to use when in fallback mode. For example, as described above, the gateway controller 150 may supply commands that allow the network device to directly actuate the lights on a network device in another Association, or perform the other actions described above.

Finally, as shown in Process 430, the gateway controller 150 enables fallback mode in the network device. This may be accomplished by transmitting an AssociationFallbackSet command. This new command may be part of the Management Command Class, for example.

Once the network device has received the AssociationFallbackSet command, it is able to operate in the manner described above.

Figure 5:
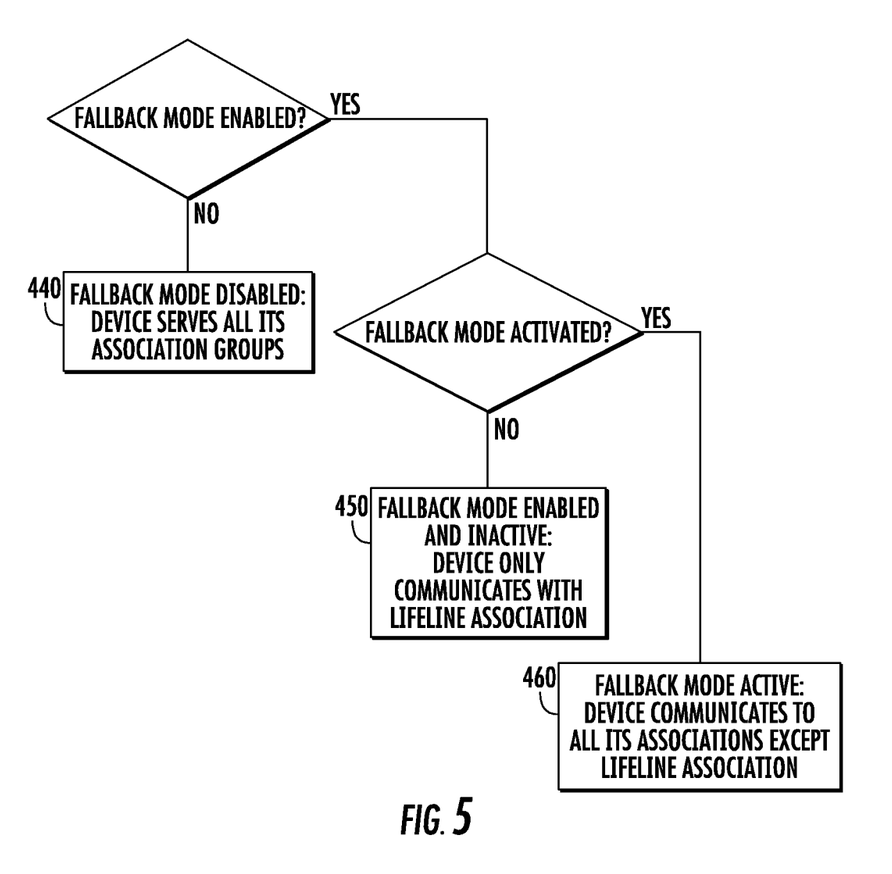
FIG. 5 shows the high level operation of a network device according to one embodiment.

FIG. 5 shows the operation of a network device according to one embodiment. When the fallback mode is not enabled, the network device should serve all association groups independently, as shown in Process 440. Any event related to a specific association group should cause the network device to send relevant commands to destinations configured for that association group.

When the fallback mode is enabled, the network device should serve only the Lifeline association group as long as the Lifeline destination(s) acknowledge commands correctly. This is referred to as fallback inactive mode and is shown in Process 450.

If, however, the Lifeline destination (in other words, the gateway controller 150) fails to acknowledge commands while the fallback mode is enabled, the network device should not serve the Lifeline association group and the network device should serve all other association groups than the Lifeline association group. This is the fallback mode active state and is shown in Process 460. In this case, any event related to a specific (non-Lifeline) association group should cause the network device to send relevant commands to destinations configured for that association group.

Figure 6:
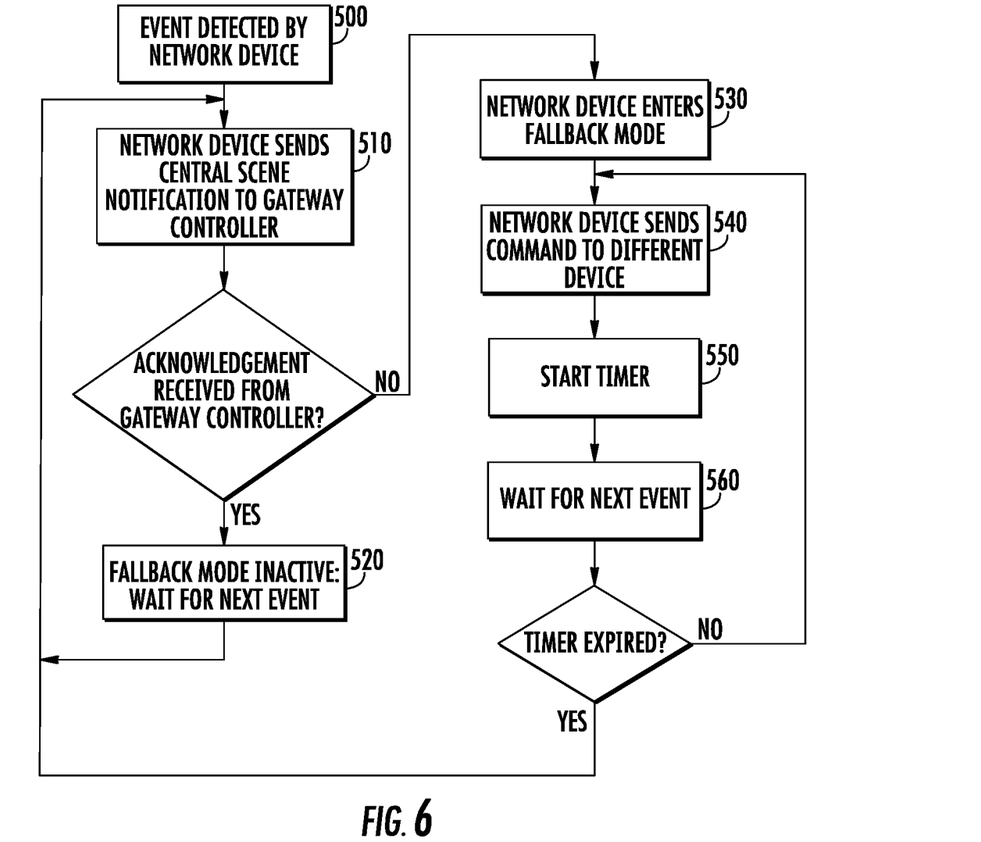
FIG. 6 shows the operation of a network device according to one embodiment.

FIG. 6 shows the operation of a network device with fallback mode capability according to one embodiment. First, as shown in Process 500, the network device detects some event, such as a movement, a button actuation, smoke or another condition. In response, as shown in Process 510, the network device transmits a Central Scene Notification to the gateway controller 150 in response to the event. If the network device receives an acknowledgement from the gateway controller 150, the actions of the network device are complete and the network device waits for another event, as shown in Process 520. At this point, fallback mode is inactive.

However, if the network device fails to receive an acknowledgement from the gateway controller 150, the network device enters fallback mode, as shown in Process 530. Once in fallback mode, the network device transmits a command to a different destination, as shown in Process 540. This command may have been supplied to the network device by the gateway controller 150 during initialization, as described in FIG. 4. Further, the destination may be determined based on information supplied to the network device during the initialization, as described in FIG. 4.

Once in fallback mode, the network device may remain in this mode indefinitely until it receives a communication from the gateway controller 150.

In other embodiments, the network device may continue to remain in fallback mode for a predetermined period of time. When in fallback mode, the network device communicates directly with other network devices, as shown in Process 540, but does not communicate with the gateway controller 150.

Thus, in this embodiment, the network device starts a timer after entering fallback mode, as shown in Process 550. After the predetermined time period, the network device may attempt to communicate with the gateway controller 150 again. In one embodiment, the network device may wait for the next event, as shown in Process 560. When that next event occurs, the network device checks if the timer has expired. If so, the network device may attempt to transmit a Central Scene Notification message as shown in Process 510. If the gateway controller 150 responds, the network device exits fallback mode. If the timer has not expired, the network device transmits a message to a different network device, as shown in Process 540.

In another embodiment, the monitoring of the connectivity to the gateway controller 150 may be combined with the transmission of WakeUp Notifications. For example, always-on nodes may send a NOP command to the gateway controller 150 after having sent commands to other network devices to see if the gateway controller 150 is online again, but only after some minimum duration since the last attempt. In certain embodiments, the minimum duration may be at least one minute.

Additionally, although not shown in FIG. 6, any communication received from the gateway controller 150 may cause the network device to revert to the Fallback mode inactive state, as shown in Process 520.

Figure 7:
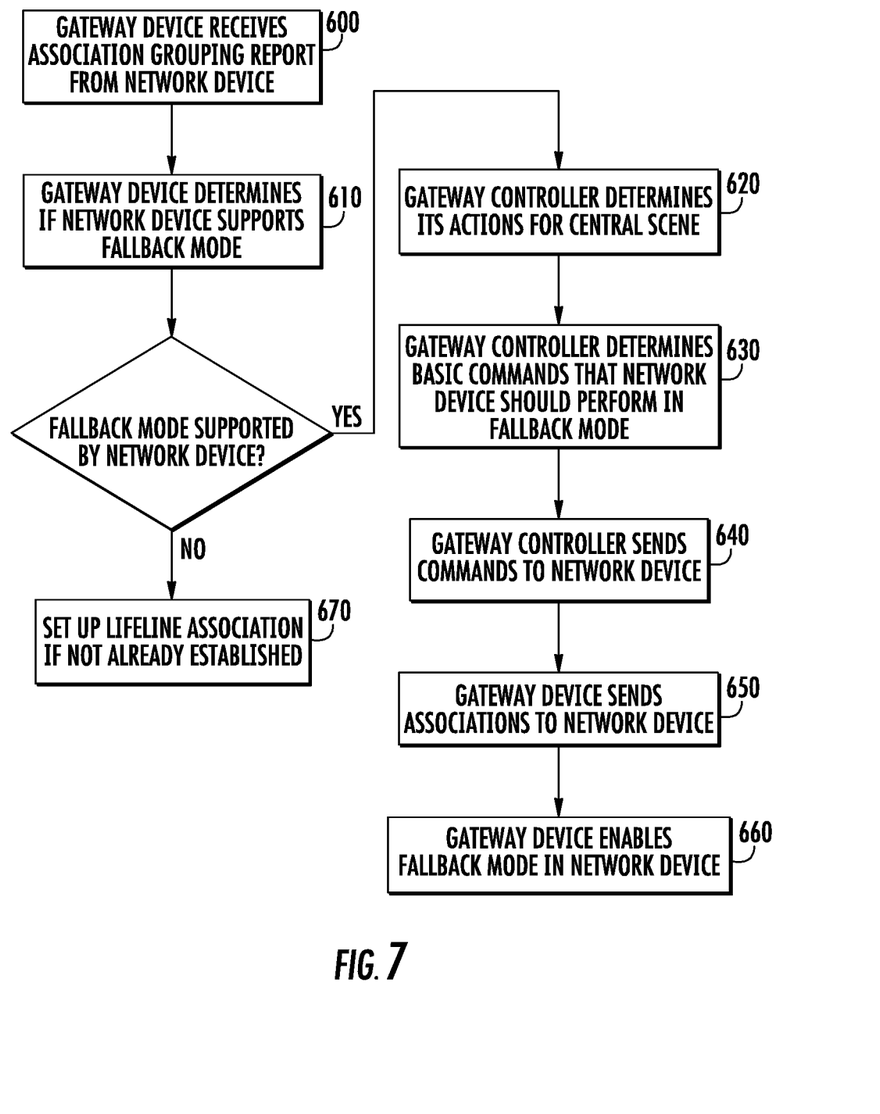
FIG. 7 shows the operation of the gateway controller according to one embodiment.

FIG. 7 shows the operation of the gateway controller 150 according to one embodiment. As shown in Process 600, the gateway controller 150 receives an Association Grouping Report, or other suitable command that provides an indication of whether the network device supports fallback mode. The gateway controller 150 then determines whether the network device supports fallback mode, as shown in Process 610. If the network device supports fallback mode, the gateway controller 150 determines what its actions would be for the Central Scene, as shown in Process 620. For example, the gateway controller 150 may activate lights, dim or change the colors of lighting in the room, play audio files, open or close window coverings. The gateway controller 150 then determines what action the network device should perform in fallback mode. Specifically, the network device may only support a limited number of associations and commands and therefore cannot perform the same actions that the gateway controller 150 would perform. Therefore, the gateway controller 150 must determine which action the network device should perform and which other device that network device should send that action to, as shown in Process 630. For example, rather than performing all of the actions noted above, the network device may only turn on a particular light. The gateway controller 150 then sends these commands to the network device, as shown in Process 640. The gateway controller 150 also sends the associations to the network device, as shown in Process 650. Finally, once having sending this information to the network device, the gateway controller 150 sends a command to the network device to enable fallback mode, as shown in Process 660.

If, however, the network device does not support fallback mode, the gateway controller 150 does not perform any operations if the Lifeline association is already established. If the Lifeline association is not already established, the gateway controller 150 will set it up, as shown in Process 670.

The present system has many advantages. Importantly, the system described herein allows a home network to continue operating even if the gateway controller 150 is non-functional or inaccessible. Thus, a minimal level of functionality can be maintained until the gateway controller 150 is repaired. Without this resilience, a failure of the gateway controller may be catastrophic and require an urgent service call.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of operating a network, wherein the network comprising a plurality of network devices and a gateway controller, the method comprising:
detecting an event at a first network device;
transmitting a notification from the first network device to the gateway controller, reporting the event; and
entering a fallback mode at the first network device if no response is received from the gateway controller, wherein, during fallback mode, the first network device transmits commands to other network devices, different from the gateway controller.

2. The method of claim 1, wherein the gateway controller provides the commands and identities of the other network devices to be used during fallback mode to the first network device.

3. The method of claim 1, wherein, if a response is received from the gateway controller, the gateway controller transmits commands to other network devices in response to the notification.

4. The method of claim 1, further comprising:
detecting a second event at the first network device; and
sending a command from the first network device to another network device if the first network device is in the fallback mode.

5. The method of claim 1, further comprising:
detecting a second event at the first network device while in fallback mode;
determining an amount of time that has elapsed since the first network device entered fallback mode; and
sending a report from the first network device to the gateway controller if the amount of time is greater than a predetermined threshold.

6. The method of claim 5, further comprising:
sending a command from the first network device to another network device if the amount of time is less than the predetermined threshold.

7. The method of claim 1, wherein the network is a Z-Wave network.

8. A method of operating a network, the network comprising a network device and a gateway controller, comprising:
sending a report from the network device to the gateway controller, wherein the report indicates whether a fallback mode is supported;
sending from the gateway controller to the network device a set of commands defining groupings;
sending from the gateway controller to the network device a set of commands to be used in fallback mode; and
sending a command from the gateway controller to the network device to enable fallback mode.

9. The method of claim 8, further comprising:
operating the network device in normal operating mode while the network device is able to communicate with the gateway controller; and
switching the network device to fallback mode when the network device is unable to communicate with the gateway controller.

10. The method of claim 9, wherein, in normal mode, the network device transmits reports to the gateway controller.

11. The method of claim 9, wherein, in fallback mode, the network device transmits commands, selected from the set of commands, to other network devices, wherein the other network devices are identified in the groupings.

12. The method of claim 8, wherein the network is a Z-Wave network.

13. A network device, comprising:
a network interface;
a processing unit; and
a memory in communication with the processing unit, the memory comprising instructions, which when executed by the processing unit; enable the network device to:

detect an event;

transmit a notification to a gateway controller using the network interface, reporting the event;

enter a fallback mode if no response is received from the gateway controller; and transmit commands using the network interface to other network devices, different from the gateway controller while in fallback mode.

14. The network device of claim 13, further comprising instructions which enable the network device to:

detect a second event; and send a command using the network interface to another network device if the network device is in the fallback mode.

15. The network device of claim 13, further comprising instructions which enable the network device to:

detect a second event while in fallback mode;

determine an amount of time that has elapsed since the network device entered fallback mode; and send a report to the gateway controller using the network interface if the amount of time is greater than a predetermined threshold.

16. The network device of claim 15, further comprising instructions which enable the network device to:

send a command to another network device using the network interface if the amount of time is less than the predetermined threshold.

17. The network device of claim 13, wherein the network interface utilizes a Z-Wave protocol.

18. A gateway controller, comprising:

a network interface;

a processing unit; and a memory in communication with the processing unit, the memory comprising instructions, which when executed by the processing unit; enable the gateway controller to:

receive a report from a network device using the network interface;

determine based on the report whether the network device supports fallback mode;

determine actions to perform based on an event reported by the network device;

determine basic commands that network device should perform in fallback mode;

transmit the basic commands to network device using network interface; and transmit a command to the network device enabling fallback mode.

19. The gateway controller of claim 18, further comprising instructions which enable the gateway controller to:

transmit groupings to the network device, wherein the groupings are used by the network device in fallback mode.

20. The network device of claim 18, wherein the network interface utilizes a Z-Wave protocol.

\* \* \* \* \*